United States Patent
McDonald

(10) Patent No.: US 10,498,631 B2
(45) Date of Patent: Dec. 3, 2019

(54) ROUTING PACKETS USING DISTANCE CLASSES

(71) Applicant: Hewlett Packard Enterprise Development LP, Houston, TX (US)

(72) Inventor: Nicholas George McDonald, Fort Collins, CO (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 228 days.

(21) Appl. No.: 15/677,504

(22) Filed: Aug. 15, 2017

(65) Prior Publication Data
US 2019/0058651 A1 Feb. 21, 2019

(51) Int. Cl.
| | |
|---|---|
| *H04L 12/733* | (2013.01) |
| *H04L 12/721* | (2013.01) |
| *H04L 12/701* | (2013.01) |
| *H04L 12/725* | (2013.01) |
| *H04L 12/713* | (2013.01) |

(52) U.S. Cl.
CPC .......... *H04L 45/122* (2013.01); *H04L 45/00* (2013.01); *H04L 45/44* (2013.01); *H04L 45/3065* (2013.01); *H04L 45/586* (2013.01)

(58) Field of Classification Search
CPC combination set(s) only.
See application file for complete search history.

(56) References Cited

U.S. PATENT DOCUMENTS

| | | | |
|---|---|---|---|
| 5,541,914 A * | 7/1996 | Krishnamoorthy | ... H04L 49/254 370/427 |
| 5,701,416 A | 12/1997 | Thorson et al. | |
| 7,633,940 B1 | 12/2009 | Singh et al. | |
| 8,537,677 B2 | 9/2013 | Ahn et al. | |
| 8,565,115 B2 | 10/2013 | Tanaka et al. | |
| 2002/0131363 A1 | 9/2002 | Beshai et al. | |

(Continued)

FOREIGN PATENT DOCUMENTS

| | | |
|---|---|---|
| WO | WO-2013044469 | 4/2013 |
| WO | 2014/151428 A1 | 9/2014 |

OTHER PUBLICATIONS

European Search Report and Search Opinion Received for EP Application No. 18189030.2, dated Nov. 30, 2018, 8 pages.

(Continued)

*Primary Examiner* — Steven H Nguyen
*Assistant Examiner* — Emmanuel K Maglo
(74) *Attorney, Agent, or Firm* — Hewlett Packard Enterprise Patent Department

(57) ABSTRACT

Examples relate to routing packets using distance classes in multidimensional networks. A packet is received at a network device in a fully connected multidimensional network and all possible candidate output ports for the packet to be routed to the destination network device are determined. The candidate output ports correspond to candidate minimal paths and candidate non-minimal paths between the network device and the destination network device along all remaining unaligned dimensions of the multidimensional network. An optimal output port among all the candidate output ports is selected and the packet is routed to a next hop in the network though the optimal output port and using a next distance class.

14 Claims, 5 Drawing Sheets

(56) References Cited

U.S. PATENT DOCUMENTS

| | | |
|---|---|---|
| 2004/0267958 A1* | 12/2004 | Reed ............... H04L 45/00 709/238 |
| 2006/0233175 A1 | 10/2006 | Ge et al. |
| 2011/0085561 A1* | 4/2011 | Ahn ............... H04L 45/00 370/401 |
| 2011/0128963 A1 | 6/2011 | Reed et al. |
| 2012/0072635 A1* | 3/2012 | Yoshida ............ H04L 49/254 710/306 |
| 2012/0300669 A1 | 11/2012 | Zahavi |
| 2013/0094855 A1 | 4/2013 | He |
| 2014/0140341 A1 | 5/2014 | Bataineh et al. |
| 2015/0103671 A1 | 4/2015 | Ernstrom et al. |
| 2015/0249590 A1 | 9/2015 | Gusat et al. |
| 2016/0344615 A1 | 11/2016 | Hao et al. |

OTHER PUBLICATIONS

Li, Z. et al., ESPN: A case for energy-star photonic on-chip network, (Research Paper), Sep. 2013, 6 Pgs.

Rashid, F., Reliable NetworkOnChip in the ManyCore Era, (Research Paper), Jun. 30, 2009, 24 Pgs.

Sudeep Ghosh et al, A Deadlock free Algorithm for NoC based System Using Distance Class Approach, (Research Paper), 2013, 5 Pgs.

Sudeep Ghosh et al, A General Purpose Simulator for Network-On-Chips, 2012, 5 Pgs.

European Search Report and Search Opinion Received for EP Application No. 18189331.4, dated Nov. 27, 2018, 8 pages.

* cited by examiner

ROUTING PACKETS USING DISTANCE CLASSES

BACKGROUND

Routing algorithms are algorithms that select a path for traffic in a network, or between or across multiple networks. These routing algorithms may be implemented in the computer network devices forming the network. When a data packet leaves its source, there are many different paths it can take to its destination. Different routing algorithms may be used to determine the best path between the source and the destination. Computer network devices in a network, such as routers and switches, may implement adaptive routing algorithms that calculate, for the packets passing through the network and at every hop in the path to their destination, the best path to take based on the network load. Adaptive routing algorithms may use virtual channels (VCs) to route packets through the network which may avoid deadlock and reduce head-of-line blocking and may further improve network latency and throughput.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
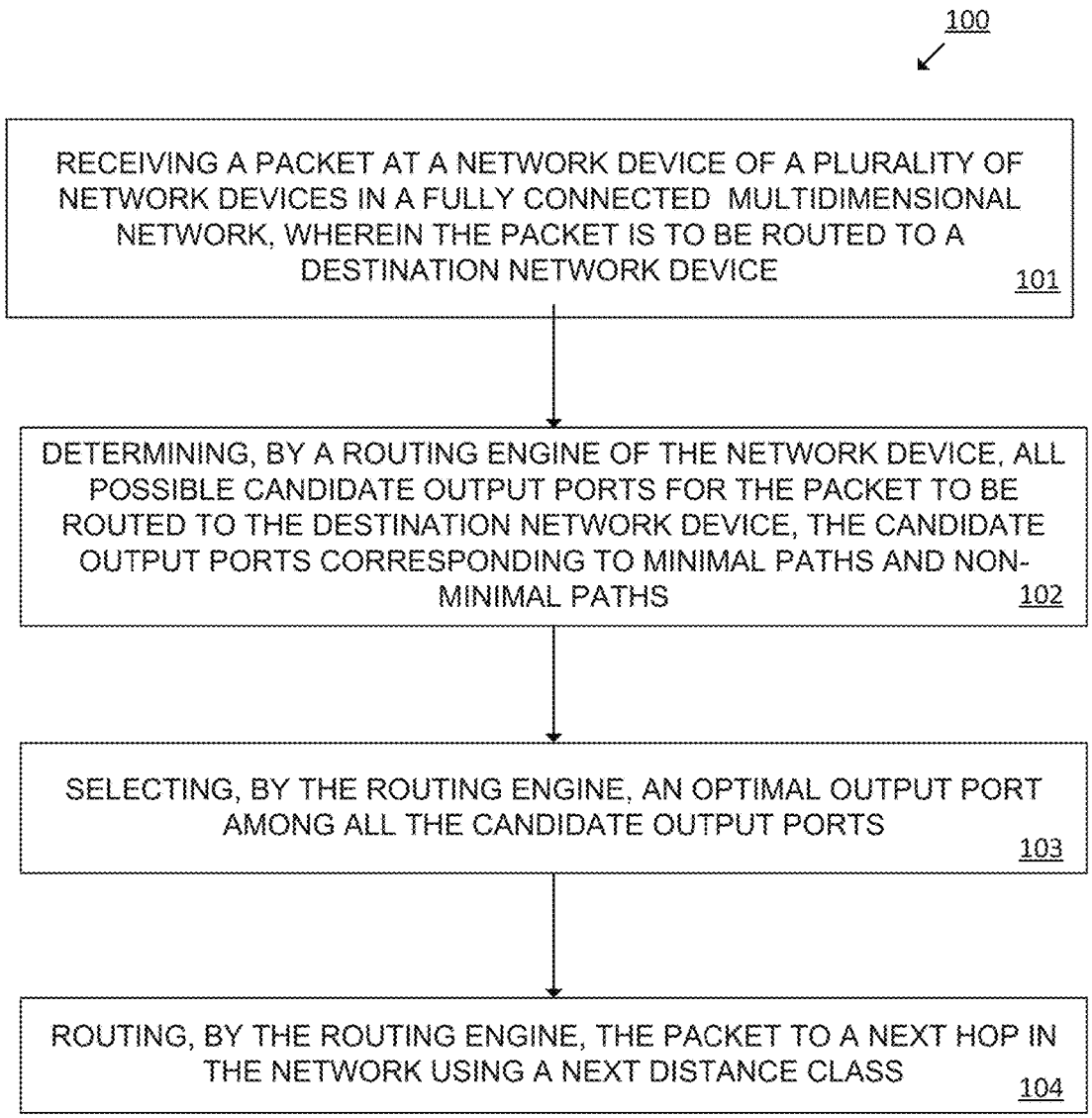
FIG. 1 is a flowchart of an example method for routing packets in multidimensional networks using distance classes.

Examples disclosed herein describe methods for routing packets in multidimensional networks using distance classes. These methods may comprise receiving a packet at a network device of a plurality of network devices in a fully connected multidimensional network, wherein the packet is to be routed to a destination network device. Then, a routing engine of the network device may determine all possible candidate output ports, among all existing output ports in the network device, for the packet to be routed to the destination network device. These candidate output ports may correspond to candidate minimal paths and candidate non-minimal paths between the network device and the destination network device. The routing engine may further select an optimal output port among all the candidate output ports and, then, may route the packet to a next hop in the network through the optimal output port and using a next distance class.

As generally used herein, a routing engine may represent a combination of hardware and software logic in a network device for routing packets from a source network device to a destination network device in a network using distance classes. Distance classes may refer to groups of channel resources that are grouped into numbered classes. The numbered classes may have restrict allocation of resources so that packets acquire resources from classes in any order, for example, in an ascending order, descending order or according to a random, but fixed permutation. Examples of distances classes may include packet buffers, packet buffers based on distances or virtual channels.

For example, a method of enforcing an ascending resource allocation may require a packet at distance "i" from its source network device to allocate a resource from class "i". At the source network device, packets may be injected into resource class 0. At each hop, the packet may acquire a resource of the next highest class. With this system, a packet holding a packet-buffer from class "i" can wait on a buffer only in class "i+1". Similarly, a packet holding a virtual channel in class "i" can only wait on virtual channels in higher numbered classes. Packets may only travel uphill in terms of resource classes as they travel through the network. Because a packet holding a resource from class "i" can never wait, directly or indirectly, on a resource in the same or lower numbered class, no cycle in the resource dependence graph exists and it is deadlock free.

In some other examples, a fully connected N-dimensional network, with "N" being an integer greater than "0", may be provided. The fully connected N-dimensional network may be provisioned with "2*N" distance classes. This N-dimensional network and the "2*N" distance classes may be provisioned by, for example, a network administrator or manager that may provide the required resources for the network. Then, the routing engine in each of the network devices in the fully connected N-dimensional network may enable de-routing the packets to hops corresponding to non-minimal paths wherein said hops link the network device to an intermediate network device in a dimension of the N-dimensional network and wherein the packet de-routes at most once per dimension. As used herein, the de-routing of a packet includes sending the packet to a next hop along a not-shortest-possible path towards the packets destination network device.

In some other examples, a fully connected N-dimensional network, with "N" being a integer greater than "0", may be provided. The fully connected N-dimensional network may be provided with "N+M" distance classes, with "M" being an integer greater than "0". This N-dimensional network and the "N+M" distance classes may be provided by, for example, the network administrator or manager that may implement the required resources for the network. Then, the routing engine in each of the network devices in the fully connected N-dimensional network may enable de-routing the packets to hops corresponding to non-minimal paths wherein the hops link the network device to an intermediate network device in a dimension of the N-dimensional network and wherein the packet de-routes a maximum of "M" times until reaching the destination network device.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 shows a flowchart of an example method 100 for routing packets in multidimensional networks using distance classes. Implementation of this method 100 is not limited to such example.

In various examples, a multi-dimensional network may include two dimensional (2D) or three dimensional (3D) meshes, crossbars, multi-stage networks (e.g., the butterfly, banyan, or Benes networks), Clos, folded-Clos, and flattened butterfly. A HyperX network is a symmetric generalization of the class of interconnection topologies known as flattened butterfly networks, where network devices in the network are all-to-all connected in each dimension in a multiple dimension topology. As used herein, a network device may refer to devices that determine the route or direction a data packet is to take in a network. Examples of network devices may be routers and switches. As used herein, a dimension may refer to a set of network devices that are connected, where connected means there is at least one path between every distinct pair of network devices in the set of network devices.

At step 101 of the method 100, a packet is received at a network device of a plurality of network devices in a fully connected multidimensional network. The packet is to be routed to a destination network device.

In such example, the fully connected multidimensional network may have at least the following properties: 1) the network devices (network nodes, e.g., switches, routers, etc.) used to implement the multidimensional network topology all have the same radix, "R" (i.e., the total number of ports per network device is "R"); 2) for each network device, a fixed number of ports, "T", are reserved for interconnection with up to a respective "T" terminal devices per network device (out of the total number of terminals, "S"), thereby leaving each network device with "R-T" output ports for interconnecting with other devices to form the multidimensional network topology; 3) network devices are interconnected in multiple dimensions, with the number of dimensions represented by a variable "L". For example, network devices can be considered as being points in an L-dimensional integer lattice or array; and 4) each network device in the topology is fully connected (e.g., all-to-all connected) with all its neighbor network devices in each dimension of the multidimensional network topology.

In some examples, the fully connected multidimensional network may be a network selected among a HyperX network and a flattened butterfly network.

At step 102 of the method 100, the routing engine of the network device determines all possible candidate output ports for the packet to be routed to the destination network device along all remaining unaligned dimensions of the fully connected multidimensional network. These candidate output ports correspond to the respective output links between the network device and the next hops for the packet towards the destination network device along all remaining unaligned dimensions of the multidimensional network. These output links, in turn, correspond to candidate output paths, including candidate minimal paths and candidate non-minimal paths, between the network device and the destination network device. In some examples, the routing engine may determine all possible candidate routes for the packet by, for example, using a pre-existing routing table stored in the network device or by performing arithmetic operations, for example using fixed function logic in the network device. This routing table may be periodically updated by a network controller connected to the network devices of the multidimensional network topology.

At step 103 of the method 100, the routing engine selects an optimal output port among all the candidate output ports. In some examples, the routing engine may select the optimal output port among the candidate output ports by detecting congestion of the candidate paths and determining whether the congestion in a particular minimal path exceeds a threshold. This threshold may be established by a network manager or administrator through a network controller communicatively connected to the network device in the multidimensional network. Then, the routing engine selects, when the particular minimal path does not exceed the threshold, the candidate output port corresponding to the minimal path as the optimal output port. Alternatively, the routing engine may select, when all the candidate minimal paths exceed the threshold, a particular candidate output port corresponding to one of the non-minimal paths between the network device and the destination network device as the optimal output port.

In some other examples, the routing engine calculates a weight for each candidate path. This weight may be based on a combination of a number of hops of the candidate path and a congestion along the candidate path. Then, the routing engine may associate each of the weights previously calculated to the corresponding candidate output port in the network device. After that, the routing engine may select the optimal output port as the candidate output port corresponding to the candidate path having a lowest estimated latency.

As used herein, congestion in a network may refer to the delay sending a packet from a source network device to a destination network device due to existing data traffic in the route followed by the packet. In other examples the congestion may refer to the delay sending the packet through a particular link between to linked network devices in the network. Examples of congestion include a broken link, a link whose bandwidth usage has exceeded a bandwidth parameter, a blocked link, or some other impediment to the flow of data packets across a path.

In turn, the hop count may refer to the number of intermediate network devices (e.g., network nodes) through which data is to pass between the source network device and destination network device (source node and destination node) in the network. Each network device along a data path (route) for packets between the source node and the destination node may constitute a hop, as the data is moved from one network device to another. Hop count may be therefore a measurement of a logical distance in a network.

At step 104 of method 100, the routing engine routes the packet to a next hop in the network though the optimal output port and using a next distance class. In some examples, the distance classes may be virtual channels, packet buffers, packet buffers based on distances, etc. Using a distance class for each hop in the path for a packet between the source network device and the destination network device avoids deadlocks in the network, thereby allowing packets to be routed regardless of what the hop correspond to, i.e., whether a minimal path or a non-minimal path. This makes the method especially useful in large scale networks where high latency channels exist.

Figure 2:
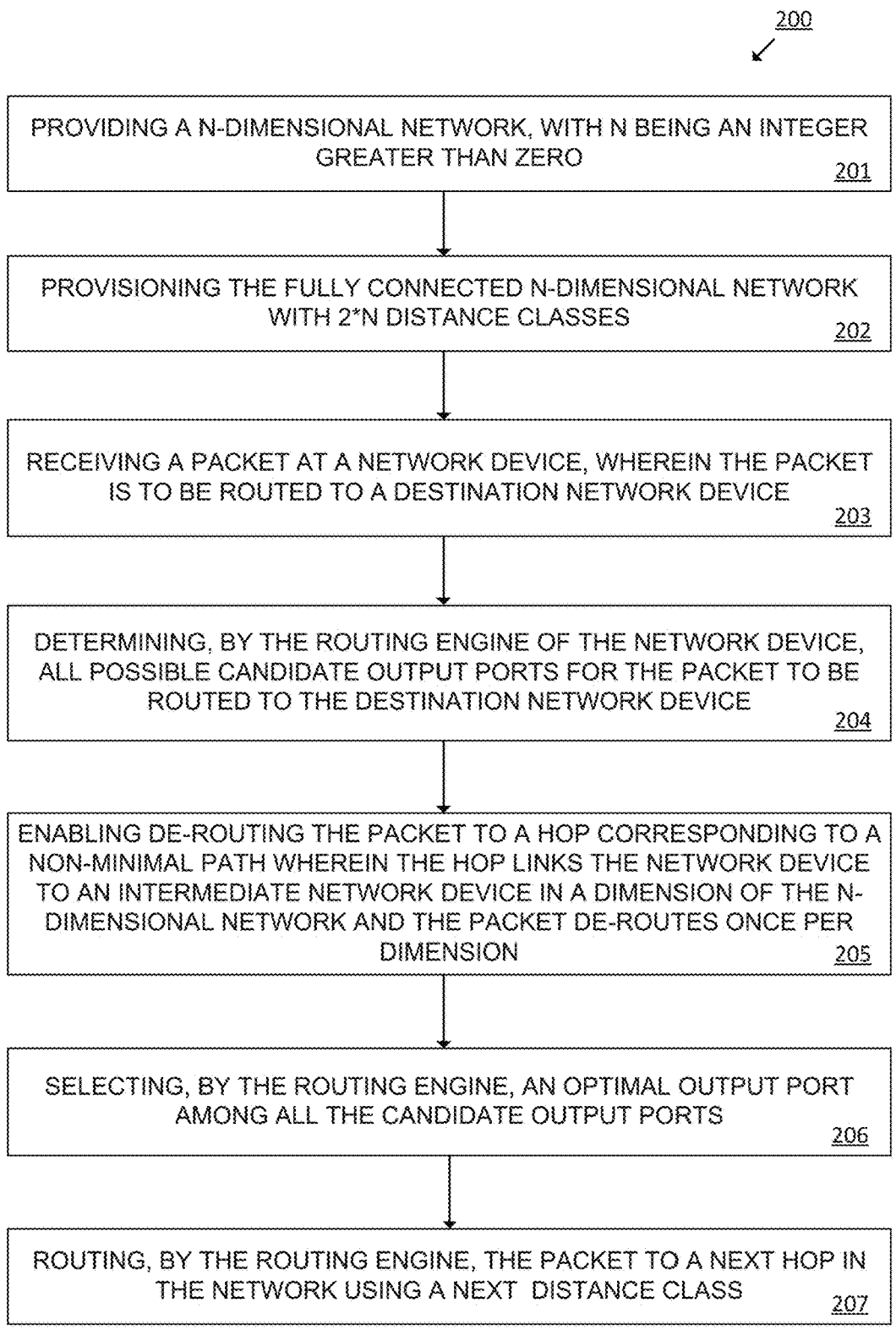
FIG. 2 is a flowchart of another example method for routing packets in multidimensional networks using distance classes, including enabling the packets to de-route to hops corresponding to non-minimal paths once per dimension.

FIG. 2 shows a flowchart of an example method 200 for routing packets in multidimensional networks using distance classes, including enabling the packets to de-route to hops corresponding to non-minimal paths once per dimension. Implementation of this method 200 is not limited to such example.

At step 201 of the method 200, a fully connected N-dimensional network, with "N" being an integer greater than "0", is provided. The N-dimensional network can be provided by a network administrator or manager that implements and deploys the network devices and the connections between the network devices creating the N-dimensional network topology.

At step 202 of the method 200, "2*N" distance classes are provisioned in the N-dimensional network. These "2'N" distance classes may be provided by the network administrator or manager that implements and deploys the corresponding network resources to provide the functionality of the "2*N" distance classes. Examples of distance classes may be packet buffers, packet buffers based on distances or virtual channels.

At step 203 of the method 200, a packet is received at a network device of the plurality of network devices in the fully connected N-dimensional network. The packet is to be routed to a destination network device. In such example, each network device in the N-dimensional network is fully connected (e.g., all-to-all connected) with all its neighbor network devices in each dimension of the "N" dimensions of the network. This N-dimensional network may be selected among an N-dimensional HyperX network and an N-dimensional flattened butterfly network. In some examples, "N" may range from 1 to 4 dimensions. In some other examples, "N" may range up to 30 dimensions. For example, Hypercube networks can be up to 20-30 dimensions.

At step 204 of the method 200, the routing engine of the network device determines all possible candidate output ports for the packet to be routed to the destination network device along all remaining unaligned dimensions of the N-dimensional network. These candidate output ports may correspond to the respective output links between the network device and the next hops for the packet towards the destination network device. These output links, in turn, correspond to candidate output paths, including candidate minimal paths and candidate non-minimal paths, between the network device and the destination network device.

At step 205 of the method 200, the routing engine in the network device enables de-routing the packets to hops corresponding to non-minimal paths wherein said hops link the network device to an intermediate network device in a dimension of the N-dimensional network and wherein the packet de-routes at most once per dimension. A de-routing path, as used herein, means a path other than the shortest path between two network devices. For example, a shortest path may be determined by applying Dijkstra's algorithm, the Floyd-Warshall algorithm, the Bellman-Ford algorithm, or some other suitable algorithm to a network. Constraints on utilizing a de-routed path are that the de-route selection cannot cause an aligned dimension to become unaligned, and at most one de-route per dimension can be performed.

At step 206 of the method 200, the routing engine selects an optimal output port among all the candidate output ports. For example, the routing engine may select the optimal output port among the candidate output ports by detecting congestion of the candidate paths and determining whether the congestion in a particular minimal path exceeds a threshold. This threshold may be established by a network manager or administrator through a network controller communicatively connected to the network device in the multidimensional network. Then, the routing engine selects, when the particular minimal path does not exceed the threshold, the candidate output port corresponding to the minimal path as the optimal output port. Alternatively, the routing engine may select, when all the candidate minimal paths exceed the threshold, a particular candidate output port corresponding to one of the non-minimal paths between the network device and the destination network device as the optimal output port. In some other examples, the routing engine selects the optimal output port as the candidate output port corresponding to the candidate path having a lowest estimated latency based on the weights previously assigned to the output ports in the network devices.

At step 207 of method 200, the routing engine routes the packet to a next hop in the network though the optimal output port and using a next distance class. This next distance class may be a next packet buffer, a next packet buffer based on distances or a next virtual channel. Besides, the next distance class maybe selected among an order increased distance class (e.g., an increased VC; VC0→VC1→VC2), an order decreased distance class (e.g., decreased VC; VC2→VC1→VC0) and a randomly permutated distance class with a fixed permutation ((e.g., randomly permutated VC; VC0→VC2→VC4, with fixed permutation being 2).

Figure 3:
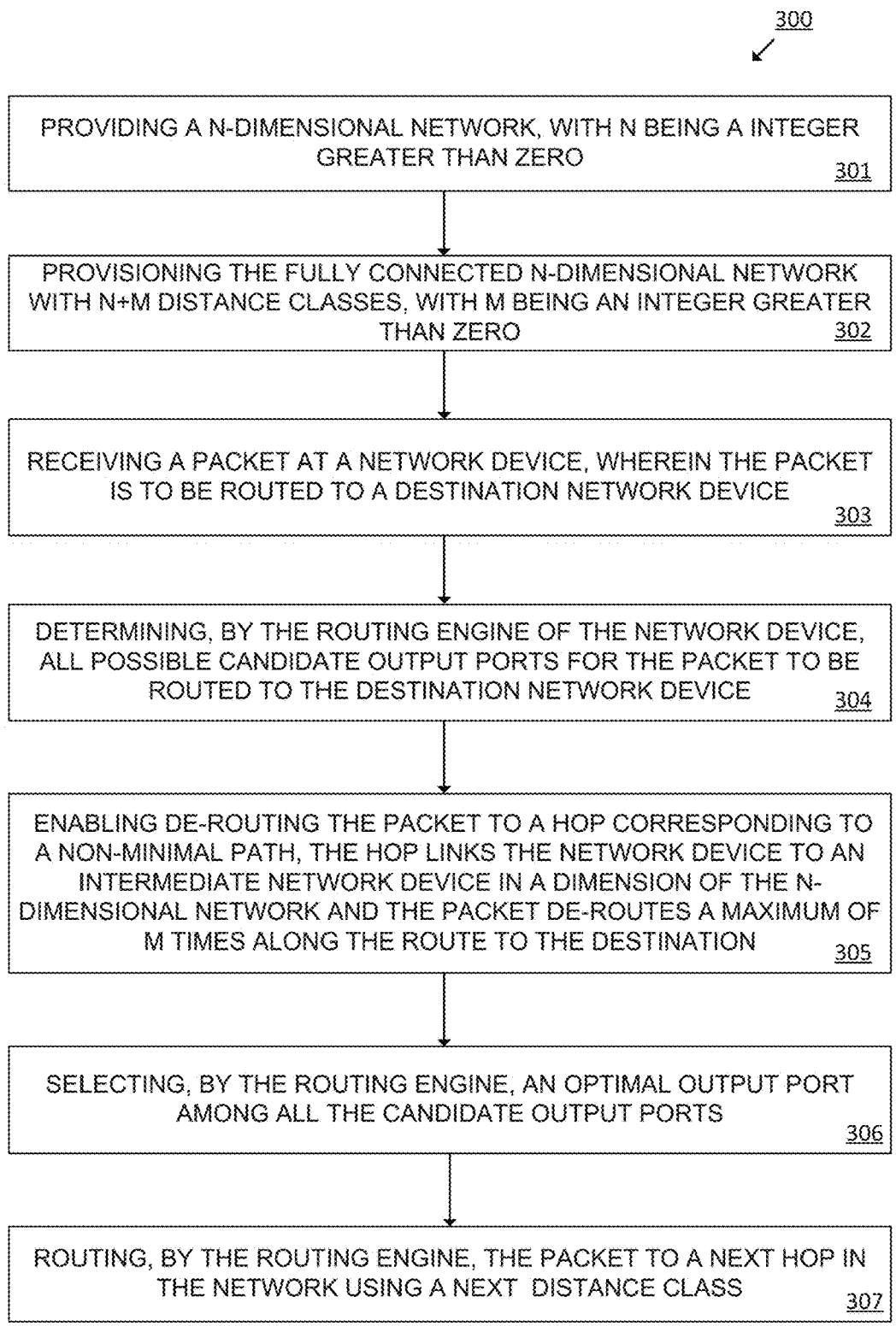
FIG. 3 is a flowchart of another example method for routing packets in multidimensional networks using distance classes, including enabling the packets to de-route to hops corresponding to non-minimal paths up to a pre-defined number of times.

FIG. 3 shows a flowchart of an example method 300 for routing packets in multidimensional networks using distance classes, including enabling the packets to de-route to hops corresponding to non-minimal paths up to a pre-defined number of times. Implementation of this method 200 is not limited to such example.

At step 301 of the method 300, a fully connected N-dimensional network, with "N" being an integer greater than "0", is provided.

At step 302 of the method 300, "M+N" distance classes are provisioned in the N-dimensional network, with "M" being an integer greater than "0". These "M" distance classes may be provided by the network administrator or manager that implements and deploys the corresponding network resources to provide the functionality of the "M+N" distance classes.

At step 303 of the method 300, a packet is received at a network device of the plurality of network devices in the fully connected N-dimensional network. The packet is to be routed to a destination network device. The N-dimensional network may be selected among an N-dimensional HyperX network and an N-dimensional flattened butterfly network. In some examples, "M" may be lesser or equal to "N".

At step 304 of the method 300, the routing engine of the network device determines all possible candidate output ports for the packet to be routed to the destination network device along all remaining unaligned dimensions of the N-dimensional network. These candidate output ports may correspond to the candidate minimal paths and the candidate non-minimal paths between the network device and the destination network device.

At step 305 of the method 300, the routing engine in the network device enables de-routing the packet to hops corresponding to non-minimal paths wherein the hops link the network device to an intermediate network device in a dimension of the N-dimensional network and wherein the packet de-routes a maximum of "M" times until reaching the destination network device.

In some other examples, the routing engine may check a number of remaining hops for the packet to reach the destination network device through the candidate minimal paths and a number of remaining distance classes available for the route (up to a maximum of "M" distance classes). Then, the routing engine may calculate a difference between the number of remaining distance classes (distance classes not already used by the packet) and the number of remaining hops in the candidate minimal paths. After that, the routing engine selects an optimal output port corresponding to a minimal path or non-minimal path as the optimal output port when the difference is greater than zero. There are this still remaining distance classes to be used and the routing engine may decide to route the packet through a minimal path or may de-route the packet through one of the remaining distance classes. Alternatively, the routing engine, may select an optimal output port corresponding to a minimal path as the optimal output port when the difference is equal to zero. After this optimal output port is selected, there are no available distance classes and the routing engine can only route the packet through the existing minimal paths.

This avoids having to store a counter in the packet with the number of de-routes already performed by the packet, because the routing engine of the network device knows at every moment the distance class used by the packet. For example, if "M" is 5 and the distance classes are virtual channels that increment in each hop, e.g., VCs: 0, 1, 2, 3, and 4, that are accessed in incremental and sequential order. When a packet is received in a particular network device of the N-dimensional network through VC2, then the routing engine knows that there are two VCs left: VC3 and VC4 through which the packet can be routed until reaching the destination network device. The routing engine also knows the remaining number of hops along the minimal path until reaching the destination network device. Then, in case there is only a single hop left along the minimal path, there is one spare VC and thus, the routing engine may select an output port corresponding to the minimal path (using one of the two available VCs) to reach the destination network device or may de-route once (using one of the two available VCs) to a network device other than the destination network device, and then this intermediate network device having one remaining VC will route the packet to the destination network device using a minimal path. In said example, in case there are two hops left along the minimal path and having two remaining VCs, then the routing engine routes the packet through the minimal path since de-routing from here forward is not allowed. Avoiding such storage of counters in the packet improves efficiency in the transmission of packets through the multidimensional networks.

In such example, there may be a minimum number of distance classes that is equal to the minimal number of hops taken across the diameter of the N-dimensional network, such that the distances classes over the minimal number of hops can be used for de-routing the packet when congestions is encountered. Besides, packets are allowed to de-route multiple times in the same dimension.

In some other examples, the routing engine may disable the ability to perform two de-routes in a row on the same dimension to save bandwidth in the network. In such examples the routing tables in the network device can be configured to restrict back-to-back de-routes in the same dimension. This adds flexibility to the packets to be routed round congestion even if seen on different planes of the same dimension.

At step 306 of the method 300, the routing engine selects an optimal output port among all the candidate output ports. For example, the routing engine may select the optimal output port among the candidate output ports by detecting congestion of the candidate paths and determining whether the congestion in a particular minimal path exceeds a threshold. In some other examples, the routing engine selects the optimal output port as the candidate output port corresponding to the candidate path having a lowest estimated latency based on the weights previously assigned to the output ports in the network devices.

At step 307 of method 300, the routing engine routes the packet to a next hop in the network though the optimal output port and using a next distance class. This next distance class may be a next packet buffer, a next packet buffer based on distances or a next virtual channel. Besides, the next distance class may be selected among an order increased distance class, an order decreased distance class and a randomly permutated distance class with a fixed permutation.

Figure 4:
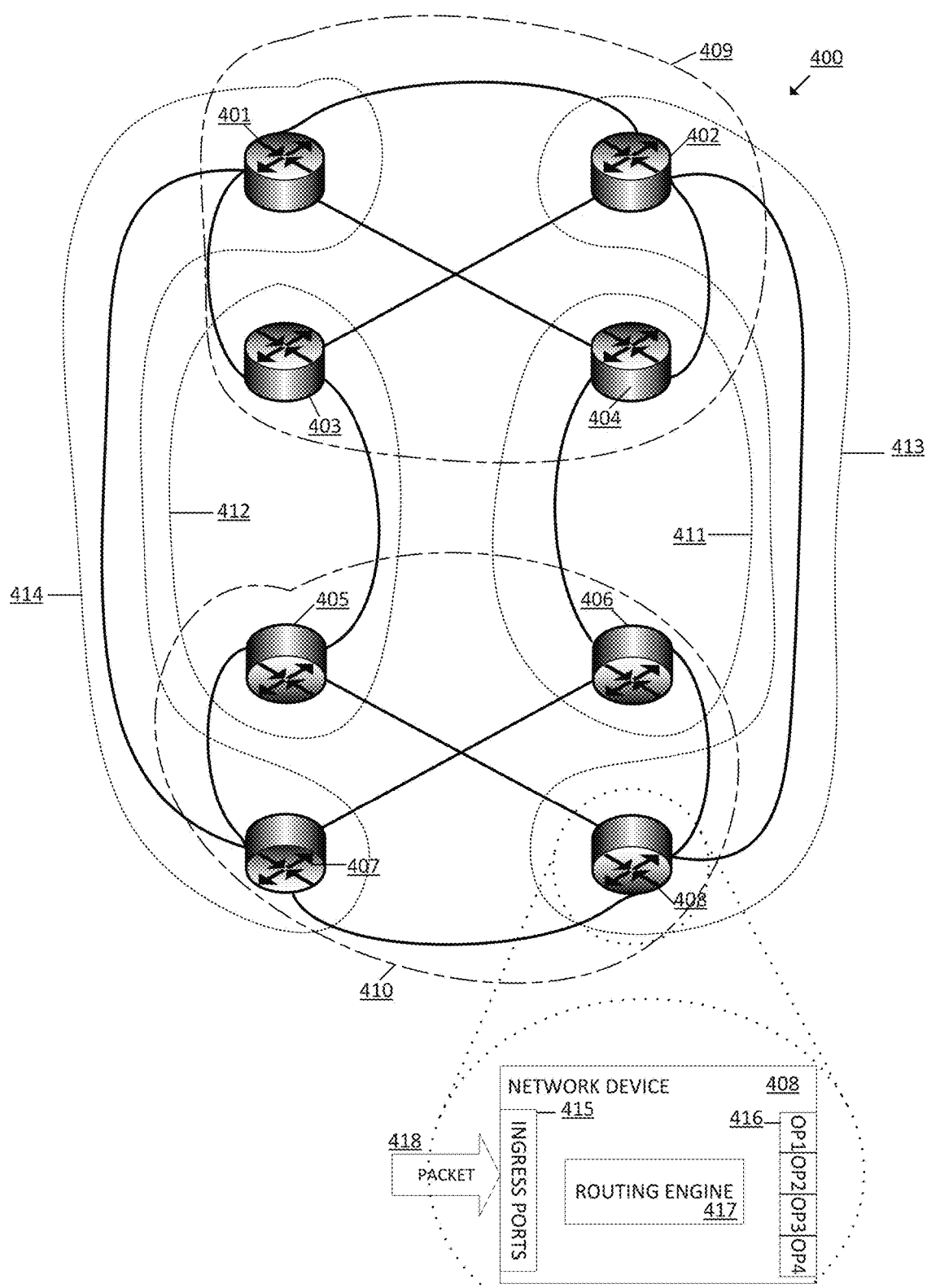
FIG. 4 is a diagram of an example two-dimensional four-by-two (4:2) HyperX network, including a detailed view of one of the network devices for routing packets using distance classes.

FIG. 4 is a diagram of an example two-dimensional four-by-two (4:2) HyperX network 400, including a detailed view of one of the network devices for routing packets using distance classes. It should be understood that the two-dimensional four-by-two (4:2) HyperX network 400 depicted in FIG. 4 may include additional components and that some of the components described herein may be removed and/or modified without departing from a scope of the example two-dimensional four-by-two (4:2) HyperX network 400. Additionally, implementation of HyperX network 400 is not limited to such example. It should also be understood that routing engine 417 of the network devices 401-408 may represent a combination of hardware and software logic in network devices 401-408 for determining routes for the packets to take from a source device to a destination device.

FIG. 4 is a diagram of example system 400 illustrating the logical view of a plurality of network devices, e.g., routers or switches, deployed into a two-dimensional four-by-two (4:2) HyperX network 400. In particular, in a two-dimensional 4:2 HyperX network 400, the first dimension has four members and each member includes two network devices. Further, the second dimension has two members and each member has four network devices. Illustrated is a first member 411 of the first dimension including network devices 404 and 406, a second member 412 of the first dimension including network devices 403 and 405, a third member 413 of the first dimension including network devices 402 and 408 and a fourth member 414 of the first dimension including network devices 401 and 407. The members of the first dimension are connected such that there is one path between every two distinct network devices in each pair. The two-dimensional 4:2 HyperX also shows a first member 409 of the second dimension, including network devices 401, 402, 403 and 404, and a second member 409 of the second dimension, including network devices 405, 406, 407 and 408. The members of the second dimension are connected such that there is one path between every two distinct network devices in each pair. Each link between each network device is bidirectional.

FIG. 4 also shows a view of the network device 408. This network device 408 has a routing engine 417 and a plurality of output ports 416 (OP1-OP4) though which the packets are routed. The network device 408 further comprises at last one ingress port 415 through which packets 418 are received. These packets may be received from other network devices in the network or may be received from processing elements (not shown in the figure) directly connected to the network device 408. These processing elements may comprise processors, memories, inter-connect interfaces, etc., and may be physically implemented as chips, boards, etc.

The routing engine 417 in the network device 408 is to receive a packet 418 that is to be routed to a destination network device (for example any of network devices 401-407) through the two-dimensional 4:2 HyperX network 400.

The routing engine 417 is further to determine all possible candidate output ports for the packet to be routed to the destination network device, the candidate output ports corresponding to candidate minimal paths and candidate non-minimal paths between the network device and the destination network device, along all remaining unaligned dimensions of the two-dimensional 4:2 HyperX network 400. The routing engine is also to select an optimal output port among all the candidate output ports and to route the packet to a next hop in the network though the optimal output port and using a next distance class.

Figure 5:
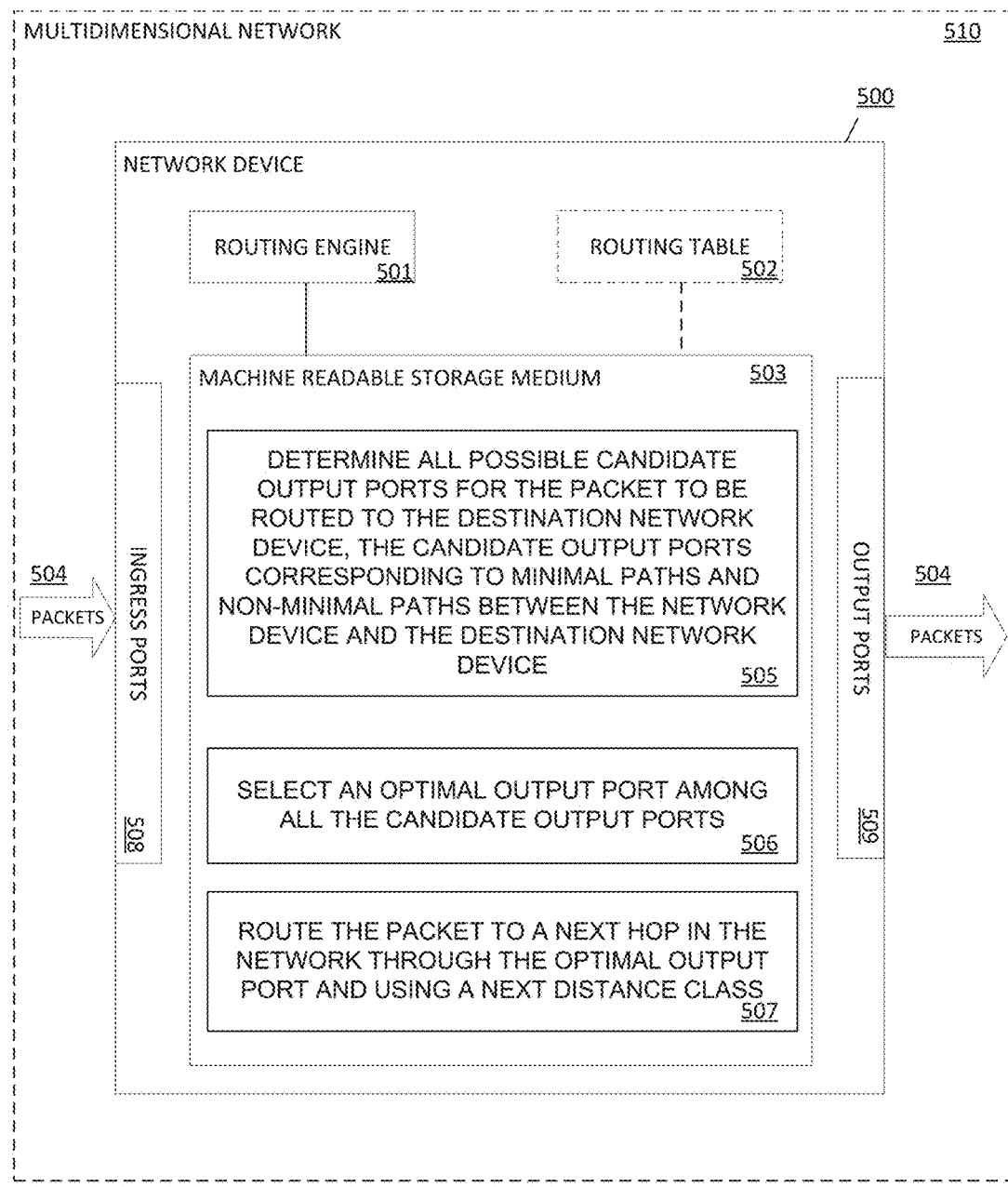
FIG. 5 is a block diagram of an example network device for routing packets in multidimensional networks using distance classes, including a machine-readable storage medium that stores instructions to be executed by a routing engine of the network device.

FIG. 5 is a block diagram of an example network device 500 for routing packets 504 in multidimensional networks using distance classes, including a machine-readable storage medium 503 that stores instructions to be executed by a routing engine 501 of the network device 500. It should be understood that the network device 500 depicted in FIG. 4 may include additional components and that some of the components described herein may be removed and/or modified without departing from a scope of the example network device 500. Additionally, implementation of network device 500 is not limited to such example. It should also be understood that routing engine 501 may represent a combination of hardware and software logic in network device 500 for determining routes for a packet to take from a source device to a destination device.

The network device 500 is depicted as including at least one ingress port 508 through which packets 504 of data are received, a plurality of egress ports 509 through which packets 504 are forwarded to a next hop in the multidimensional network towards their destination network devices, a machine readable storage medium 503, a routing engine 501 and a routing table 502. The routing engine 501 may include hardware and software logic to execute instructions, such as the instructions 505-507 stored in the machine-readable storage medium 503. While FIG. 5 shows a network device 500 comprising a routing table 502, the network device 400 may avoid having the routing table 402 by using arithmetic operations to dynamically calculate routes, metrics, weights and propagation delays when a packet is received in the network device 500 and temporarily storing this information in an internal memory (not shown in the figure). In some examples, the routing table 502 may store all the possible routes between the current network device 500 and the rest of network devices in the multidimensional network.

The routing engine 501, in response to reception of a packet 504 via any of the at least one ingress port 508 of the network device 500, the packet 504 that is to be routed to a destination network device through a plurality of network devices in the fully connected multidimensional network, determines at 505 all possible candidate output ports for the packet 504 to be routed to the destination network device along all remaining unaligned dimensions of the fully connected multidimensional network, the candidate output ports corresponding to candidate minimal paths and candidate non-minimal paths between the network device 500 and the destination network device. Then, the routing engine 501 selects at 506 an optimal output port among all the candidate output ports. After that, the routing engine 501 routes at 507 the packet to a next hop in the network though the optimal output port and using a next distance class.

In some examples the multidimensional network may be a HyperX network or a flattened butterfly network.

The routing engine 501 may include hardware and software logic to perform the functionalities described above in relation to instructions 505-507. The machine-readable storage medium 503 may be located either in the computing device executing the machine-readable instructions, or remote from but accessible to the computing device (e.g., via a computer network) for execution.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

The invention claimed is:

1. A method, comprising:
providing a fully connected N-dimensional network, N being a integer greater than 0;
provisioning the fully connected N-dimensional network with N+M distance classes, M being an integer greater than 0;
receiving a packet at a network device of a plurality of network devices in a fully connected multidimensional network, wherein the packet is to be routed to a destination network device;
determining, by a routing engine of the network device, all possible candidate output ports for the packet to be routed to the destination network device, the candidate output ports corresponding to candidate minimal paths and candidate non-minimal paths between the network device and the destination network device along all remaining unaligned dimensions of the fully connected multidimensional network;
enabling de-routing the packet to hops corresponding to non-minimal paths wherein the hops link the network device to an intermediate network device in a dimension of the N-dimensional network and wherein the packet de-routes a maximum of M times until reaching the destination network device;
checking, by the routing engine, a number of remaining hops for the packet to reach the destination network device through the candidate minimal paths and a number of remaining distance classes available for the route;
calculating a difference between the number of remaining distance classes and the number of remaining hops required by the candidate minimal paths;
selecting, by the routing engine, an optimal output port among all the candidate output ports, wherein the optimal output port corresponds to (i) a minimal path or non-minimal path when the difference is greater than zero and (ii) a minimal path when the difference is equal to zero; and
routing, by the routing engine, the packet to a next hop in the network though the optimal output port and using a next distance class.

2. The method of claim 1, wherein the next distance class is selected among an order increased distance class, an order decreased distance class and a randomly permutated distance class, wherein the permutation is fixed.

3. The method of claim 1, wherein the next distance class is selected from a group including virtual channels (VCs) and packet buffers.

4. The method of claim 1, wherein selecting the optimal output port among the candidate output ports comprises:
calculating a weight for each candidate path, the weight being based on a combination of a number of hops of the candidate path and a congestion along the candidate path; and
associating the weight to the corresponding candidate output port.

5. The method of claim 4, comprising selecting, by the routing engine, the optimal output port as the candidate output port corresponding to the candidate path having a lowest estimated latency.

6. The method of claim 1, wherein selecting the optimal output port among the candidate output ports comprises:
detecting congestion of the candidate paths;
determining whether the congestion in a particular minimal path exceeds a threshold; and
selecting, when the particular minimal path does not exceed the threshold, the corresponding candidate output port as the optimal output port; or
selecting, when all the candidate minimal paths exceed the threshold, a particular candidate output port corresponding to one of the non-minimal paths as the optimal output port.

7. The method of claim 1, comprising:
providing a fully connected N-dimensional network, N being a integer greater than 0;
provisioning the fully connected N-dimensional network with 2*N distance classes; and
enabling de-routing the packet to hops corresponding to non-minimal paths wherein the hops link the network device to an intermediate network device in a dimension of the N-dimensional network and wherein the packet de-routes at most once per dimension.

8. The method of claim 1, comprising disabling, by the routing engine, the ability to perform two deroutes in a row on the same dimension.

9. A non-transitory machine readable storage medium comprising instructions executable by a routing engine of a network device of a plurality of network devices in a fully connected multidimensional network to:
provide a fully connected N-dimensional network, N being a integer greater than 0;
provision the fully connected N-dimensional network with N+M distance classes, M being an integer greater than 0;
in response to reception of a packet in the network device, determine all possible candidate output ports for the packet to be routed to the destination network device, the candidate output ports corresponding to minimal paths and non-minimal paths between the network device and the destination network device along all remaining unaligned dimensions of the fully connected multidimensional network;
enable de-routing the packet to hops corresponding to non-minimal paths wherein the hops link the network device to an intermediate network device in a dimension of the N-dimensional network and wherein the packet de-routes a maximum of M times until reaching the destination network device;
check a number of remaining hops for the packet to reach the destination network device through the candidate path and a number of de-routes previously performed by the packet;
calculate a difference between M and the number of de-routes previously performed by the packet;
select, by the routing engine, an optimal output port among all the candidate output ports, wherein the optimal output port corresponds to: (i) a minimal path or non-minimal path as the optimal output port when the difference is greater than zero, and (ii) a minimal path as the optimal output port when the difference is equal to zero; and
route the packet to a next hop in the network through the optimal output port and using a next distance class selected from a group comprising virtual channels (VC) and packet buffers.

10. The non-transitory machine readable storage medium of claim 9, comprising instructions to use a VC for routing the packet that is different from the VCs used by other network devices to route the packet to the destination device.

11. The non-transitory machine readable storage medium of claim 9, wherein the instructions to select the optimal output port among the candidate output ports comprise instructions to:
calculate a weight for each candidate path, the weight being based on a combination of a number of hops of the candidate path and a congestion along the candidate path; and
associate the weight to the corresponding candidate output port.

12. The non-transitory machine readable storage medium of claim 11, wherein the instructions to select the optimal output port among the candidate output ports further comprise instructions to select the optimal output port as the candidate output port corresponding to the candidate path having a lowest estimated latency.

13. The non-transitory machine readable storage medium of claim 9, wherein the instructions to select the optimal output port comprise instructions to:
detect congestion of the candidate paths;
determine whether the congestion in a particular minimal path exceeds a threshold; and
select, when the particular minimal path does not exceed the threshold, the corresponding candidate output port as the optimal output port; or
select, when all the candidate minimal paths exceed the threshold, a particular candidate output port corresponding to one of the non-minimal paths as the optimal output port.

14. The non-transitory machine readable storage medium of claim 9, comprising instructions to:
provide a fully connected N-dimensional network, N being a integer greater than 0;
provision the fully connected N-dimensional network with 2*N distance classes; and
enable de-routing the packet to hops corresponding to non-minimal paths wherein the hops link the network device to an intermediate network device in a dimension of the N-dimensional network and wherein the packet de-routes once per dimension.

* * * * *